United States Patent [19]

Swanson et al.

[11] 4,434,833
[45] Mar. 6, 1984

[54] AXLE WHEEL END ASSEMBLY

[75] Inventors: Glen E. Swanson, Euclid; Larry A. Garstick, Chardon, both of Ohio

[73] Assignee: Eaton Corporation, Cleveland, Ohio

[21] Appl. No.: 370,656

[22] Filed: Apr. 21, 1982

[51] Int. Cl.³ .............................................. B60C 29/00
[52] U.S. Cl. .................................. 152/417; 141/38; 152/427; 251/344; 277/12; 285/110
[58] Field of Search .............................. 152/415–417, 152/427; 141/38; 277/153, 152, 59, 12; 251/344–346; 285/96, 98, 110, 111, 281, DIG. 25

[56] References Cited

U.S. PATENT DOCUMENTS

| | | | |
|---|---|---|---|
| 1,234,962 | 7/1917 | Tarbet | 152/417 |
| 2,989,999 | 6/1961 | Holbrook et al. | 152/416 |
| 3,362,452 | 1/1968 | Harnish | 152/416 |
| 3,866,654 | 2/1975 | Duquesne | 152/415 X |
| 4,022,422 | 5/1977 | Stone | 251/346 X |
| 4,327,922 | 5/1982 | Walther | 277/153 X |
| 4,345,770 | 8/1982 | Seeh | 277/152 X |

Primary Examiner—William A. Powell
Assistant Examiner—Thomas Bokan
Attorney, Agent, or Firm—C. H. Grace; H. D. Gordon

[57] ABSTRACT

An axle wheel end assembly (10) is provided for vehicles having an onboard tire inflation system (12). The wheel end assembly includes a rotary seal assembly (68) defining an annular air chamber (70) which seal assembly is received in a relatively protected inboardly opening annular space (69) defined by an axle spindle surface (66) and an axially inboardly extending sleeve (62) of the hub (42). Open/close valve member (110) is located outboard of the hub flange (50) interposed the fluid connections between the annular air chamber (70) and the opening (120) to the tire rim (122) for isolating the interior of the tire rim from the inflation system for storage and/or steady state driving conditions.

10 Claims, 5 Drawing Figures

AXLE WHEEL END ASSEMBLY

BACKGROUND OF THE INVENTION

1. Field of the Invention

This invention relates to axle wheel end assemblies and more particularly relates to axle wheel end assemblies for vehicles having an onboard tire inflation system.

2. Description of the Prior Art

The use of onboard tire inflation monitoring and/or tire inflation/deflation varying systems is known in the prior art, especially for use in heavy duty vehicles, such as military vehicles, wherein the vehicle will be travelling over a variety of terrains, such as over-the-road, off-the-road and/or desert conditions, and it is desirable to change the tire pressure, especially of the driving wheels. Typically, such systems utilize a remote pressure gauge in the vehicle cab whereby the operator can monitor tire inflation and/or utilize a switch or control member whereby tire inflation can be varied from the cab, preferably on the move, according to the type of terrain the vehicle is presently traversing. It is known that superior vehicle performance can be obtained over-the-road with a relatively high tire pressure (i.e. for example 75 PSI), in off-highway conditions with a relatively lower tire pressure (i.e. for example about 40 PSI) and for desert conditions with a much lower tire pressure (i.e. for example about 8-15 PSI). An inherent difficulty with prior art vehicle onboard tire pressure inflation/deflation systems has been the need for providing reliable seals to the tire which is, of course, rotating relative to the vehicle. The prior art devices have usually utilized rifle drilled axle shafts and/or housings and/or rotary seals on the outboard ends of the wheel end assemblies or at other relatively unprotected areas on the wheel end. These prior art structures were not totally satisfactory as rifle drilling of the various axle components is an expensive and difficult operation and might tend to weaken the drilled component and as the rotary seals, which are usually not as robust as the other axle wheel end components, mounted on the outboard ends or other relatively unprotected areas of the axles were subject to abuse and damage.

SUMMARY OF THE INVENTION

In accordance with the present invention, the drawbacks of the prior art have been minimized to the extent that an axle wheel end assembly for vehicles having onboard tire inflation/deflation control systems is provided which utilizes relatively well protected inboard rotary seals, eliminates the need for rifle drilling of the load supporting and/or torque transmitting axle components, provides an easily accessible on/off valve for disconnecting the tire from the onboard system during steady state conditions (i.e. when the vehicle will be traversing a relatively consistent terrain) and provides an easily accessible disconnect means for rapidly inflating or deflating the tire from a remote source of pressurized fluid.

The above is accomplished by providing a rotary seal assembly which is located in a protected inboardly opening annular space located inboard of the wheel hub bearings, providing a first fluid connection from a controlled source of pressurized fluid to the annular air chamber defined by the rotary seal assembly, providing a second fluid connection from the annular air chamber to the tire and by providing a manually operable open/close valve in the second fluid connection accessible from the outboard end of the wheel end for fluidly isolating the tire from the onboard inflation/deflation system.

Accordingly, it is an object of the present invention to provide an improved axle wheel end assembly for vehicles having an onboard tire pressure monitoring and/or tire pressure inflation/deflation system.

This and other objects and advantages of the present invention will become apparent from a reading of the description of the preferred embodiment taken in connection with the attached drawings.

DESCRIPTION OF THE PREFERRED EMBODIMENT

The term "onboard tire inflation system" as used herein is intended to include systems mounted to vehicles, usually heavy trucks and the like, which allow tire pressure of certain axle ends, usually the drive axles, to be selectively varied by the operator from a point remote from the wheels, usually the cab, from an onboard source of pressurized fluid, usually the vehicle air system and/or stored compressed air and/or an accumulator. Such systems may also include a pressure gauge, usually located adjacent the control, for monitoring existing tire pressure.

The term "inboard" is used to mean the direction axially toward the center of an axle assembly while the term "outboard" is used to mean the direction axially away from the center of an axle assembly.

Figure 1:
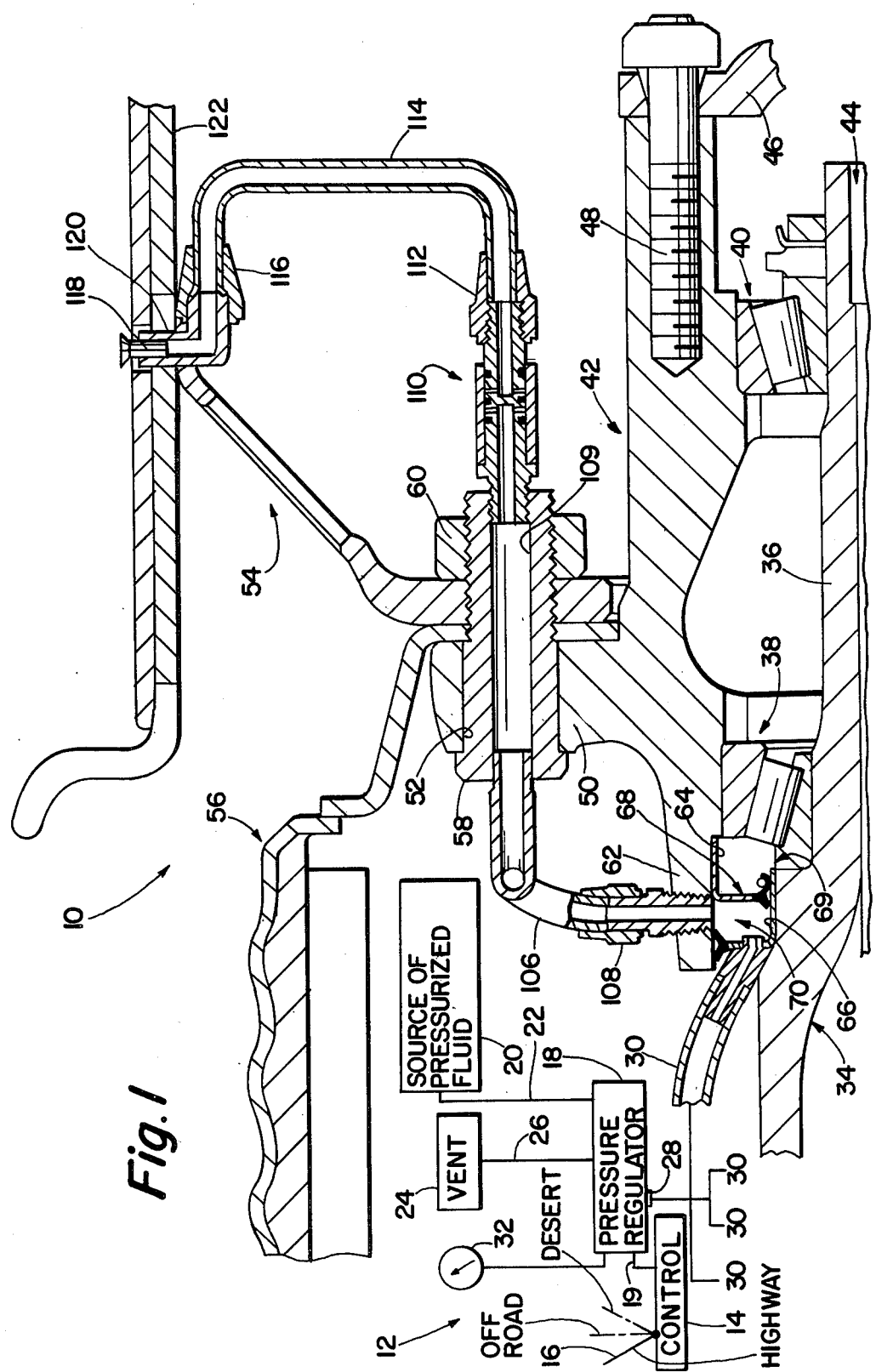
FIG. 1 is a partial view, in section, of the axle wheel end assembly of the present invention, with certain elements thereof schematically illustrated, and a schematic illustration of the onboard tire pressure monitoring and tire pressure inflation/deflation system of the present invention.

A partial cross sectional view of the axle wheel end assembly 10 of the present invention and a schematic illustration of a typical onboard tire inflation system 12 may be seen by reference to FIG. 1. The onboard tire pressure inflation system 12 comprises a control 14 which will typically be located in the vehicle operator's cab. The control 14 may have a lever or toggle 16 which is selectively movable to two or more positions for selecting a desired tire pressure. In the example illustrated, lever 16 may be moved to a highway, off-road or desert position. Typically, in a heavy duty vehicle, in highway (i.e. over-the-road) conditions it is desired that the driving tires be inflated to a pressure of about 75 pounds per square inch, in off-the-road conditions it is desired that the driving tires be inflated to a pressure of about 40 pounds per square inch and for desert operating conditions it is desired that the tires be inflated to a pressure of about 8-14 pounds per square inch. Of course, other pressures and/or other settings may be selected by the control and will fall within the scope of the present invention. The control may also include an infinitely variable control member whereby the operator may select any pressure within a given range of pressures. The control 14 is attached to a pressure regulator 18 by a line 19 which may be hydraulic and/or electric or the like. Pressure regulator 18 is connected to a source of pressurized fluid 20 by a fluid connection 22 and to a vent or exhaust 24 by a fluid connection 26. Pressure regulator 18 will supply selectively pressurized fluid to an outlet 28 which communicates with the axle wheel ends 10 via a plurality of fluid conduits 30. Pressure regulator 18 is effective to supply pressurized fluid to fluid connections 30, or to vent fluid connections 30, in accordance with the setting of control 14. A pressure gauge 32 may also be provided, preferably in the operator's cab, indicating the pressure level of pressurized fluid in conduited 30. Typically, the pressurized fluid will be pressurized air and the source of pressurized fluid 20 will be the vehicles onboard air system and/or a pressurized air accummulator.

Axle wheel end 10 includes an axle housing 34 having an outboard spindle end 36 upon which two tapered roller bearings 38 and 40 are received. A wheel hub 42 assembly surrounds the spindle end 36 of axle housing 34 and is rotationally supported on the axle housing by means of bearings 38 and 40. Axle shaft 44 is rotationally received within axle housing 34 and includes an outboard flange portion 46 which is rotationally fixed to the hub 42 by means of bolts 48 for establishing the driving relationship between the axle shaft 44 and the hub 42 as is well known in the prior art.

Wheel hub 42 includes a radially outwardly extending flange portion 50 which is provided with an annular array of bolt holes 52, only one of which is shown. The wheel assembly 54 and the brake drum assembly 56 are attachable to the hub flange 50 by means of bolts 58 and nuts 60 as is well known in the art. Of course, bolts 48 and/or 58 could be replaced by studs or the like. The above described wheel end structure is typical well known prior art wheel end structure as well as the structure utilized in connection with the present invention.

Wheel hub 42 includes an annular sleeve-like extension 62 which extends axially inboardly from the inboard bearing 38. Sleeve-like portion 62 has an annular inner diameter surface 64 which is generally concentric with and of a greater radius than the axially aligned annular outer diameter surface 66 defined by axle housing 34. An annular rotary seal assembly 68 is received in the inboardly opening annular space 69 defined between surfaces 64 and 66 and defines an annular air chamber 70 therein.

Figure 2:
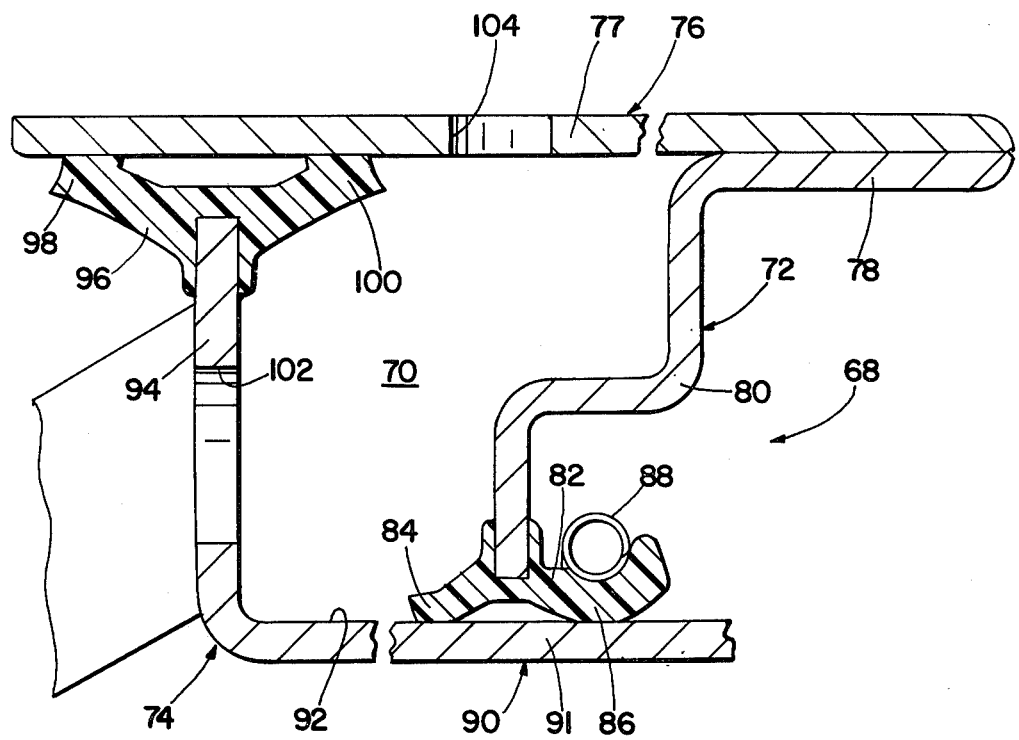
FIG. 2 is an enlarged sectional view of the rotary seal assembly schematically illustrated in FIG. 1 illustrating the annular air chamber defined thereby.

As may be seen by further reference to FIG. 2, seal assembly 68 includes a first outboard member 72 which is pressed to inner diameter surface 64 of the hub 42 and a second inboard member 74 which is pressed to outer diameter surface 66 of the axle housing spindle 36. Inboard seal member 72 includes an annular stamping 76 having an axially extending annular portion 77 which extends for substantially the axial length of surface 64, an axially extending annular portion 78 which is bent over portion 77 and an annular radially extending portion 80 which carries annular double lip rotary seal 82 at the radially inward end thereof. Briefly, seal 82 includes an inboard air seal lip 84 and an outboard oil seal lip 86. A load spring 88 may be utilized to provide a radially inward force to lip 86 as is well known in the art. Inboard seal member 74 includes an annular stamping 90 having an axially extending annular portion 91 which is sealingly engaged on its outer diameter surface 92 by lips 84 and 86 of seal 82 and an annular radially extending portion 94 which carries double lip rotary seal 96 on the radially outward end thereof. Double lip seal 96 includes an outboard dirt lip or scraper 98 and an inboard air seal lip 100, both of which lips sealingly engage portion 76 of seal member 72. An aperture 102 is provided in portion 94 of seal member 74 for sealing engagement with fluid conduit 30. An aperture 104 is provided in portion 77 of seal member 72 for fluid connection to a fluid conduit 106 by means of a threaded coupling 108 or the like.

It is understood that other structures and constructions of rotary seal assembly 68 are usable with wheel end 10 of the present invention.

Figure 4:
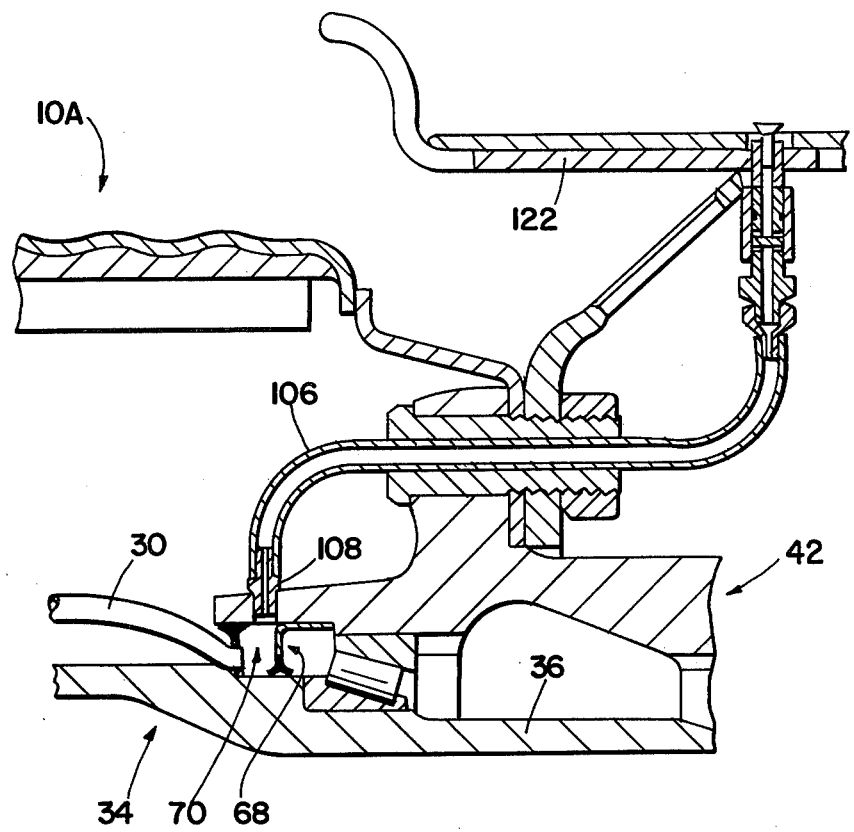
FIG. 4 is a sectional view, similar to FIG. 1, of an alternate embodiment of the present invention.

One of the bolts 58 attaching the wheel assembly 54 and brake drum assembly 56 to the flange 50 of hub 42 is provided with an axially extending bore 109 through which conduit 106 extends, or into the inboard end of which conduit 106 is fluidly connected. The remainder of the bolts 58 are standard without axially extending bores therethrough. An on/off valve 110 is fluidly connected to the outboard end of bore 109 in bolt 58 by means of a pipe connection or the like. The outboard end of valve 110 is in fluid communication by means of a standard flare tube connector 112 with a fluid conduit 114 which is in fluid communication by means of a flared connector 116. A two way check valve 118 may be mounted in aperture 120 of tire rim 122. As an alternate, see FIG. 4, valve 110 could be connected directly to aperture 120, in tire rim 122 and conduit 114 extend directly into fluid communication with bore 109 and bolt 58.

Figure 3:
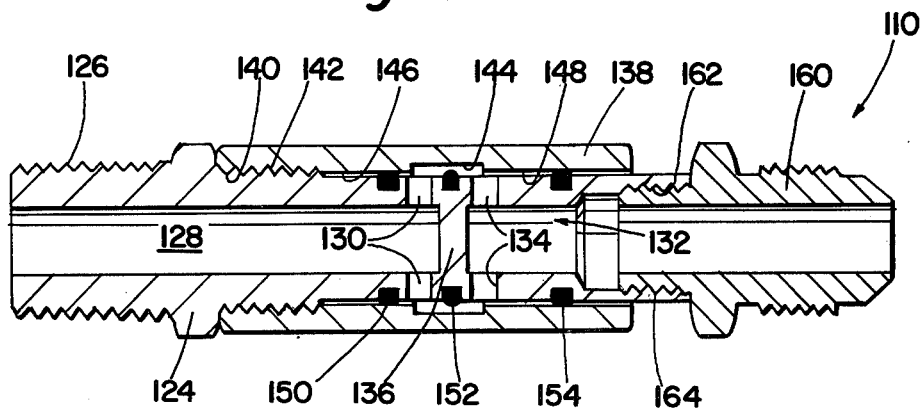
FIG. 3 is a sectional view of the manually operable on/off valve schematically illustrated in FIG. 1.

The structure of valve 110 may be seen more clearly by reference to FIG. 3. Valve 110 includes a valve body 124 having external threads 126 at the inlet or left end thereof. As valve 110 will pass fluid in both directions, it is understood that the term inlet and outlet is used for purposes of simplifying the description only and is not intended to be limiting. Valve body 124 is fluidly connected to bore 109 in bolt 58 by means of pipe connection threads 126. Valve body 124 includes an enlongated axially extending inlet bore 128 which terminates at radially extending bores 130 which communicates axially extending bore 128 with the outer radial surface of the valve body 124. An axially extending outlet bore 132 which extends from the outlet end of the valve body and terminates at radially extending bores 134 which communicate outlet bore 132 with the outer radial surface of valve body 124. The central portion 136 blocks direct axial communication between bores 128 and 132. A tubular sleeve member 138 telescopically surrounds valve body 124 and carries internal threads 140 on the leftward end thereof which are threadably engaged external threads 142 provided on the valve body 124. Sleeve 138 includes an enlarged inner diameter chamber 144 located interposed relatively smaller inner diameter bore portions 146 and 148. Relatively reduced diameter portions 146 and 148 of the sleeve will receivingly engage O-ring seals 150, 152 and 154 carried by annular grooves on the outer diameter of valve body 124. Enlarged diameter chamber 144 is of a greater axial length than the axial separation between radially extending bores 130 and 134 and thus, in the position shown, will establish fluid communications between the inlet bore 128 and the outlet bore 132 of valve body 124. To close valve 110, sleeve 138 is rotated on threads 142 causing the sleeve 138 to move axially rightwardly relative to the valve body 124 whereby reduced inner diameter portion 146 will sealingly engage O-rings 150 and 152 to block fluid communicaton between inlet 128 and outlet 132 of valve 110. Threaded connector 160 which may be utilized in place of connector 112 schematically illustrated in FIG. 1 having external pipe threads 162 on the leftward end thereof is threadably and sealingly engaged with internal pipe threads 164 provided in the rightward end of bore 132 for fluid connection of conduit 114 to valve 110.

As may be seen, if it is desired to communicate tire assembly 54 with the onboard tire inflation system 12, valve 110 is placed in the open position (see FIG. 3). To isolate the tire assembly 54 from the onboard tire inflation system, valve 110 is simply closed. Additionally, if it is desired to quickly inflate tire assembly 54 from a remote source of pressurized fluid, connector 160 may simply be removed from valve 110 and connected to the remote source of pressurized fluid. Check valve 118 will close to prevent unintended deflation of the tire and quick deflation of the tire may be accomplished by removing connector 116 and placing the check valve in the open position as is well known in the art.

On/off valve 110 and connectors 112 and 116 are easily accessible and operable from the outboard end of the axle wheel end 10.

Seal assembly 68 is located inboard of the wheel hub flange 50 within a relatively well protected inboardly opening annular space defined by sleeve-like extension 62 of hub 42 which overlays annular outer diameter surface 66 of axle housing 34 and is thus well protected from damage and the like.

Figure 5:
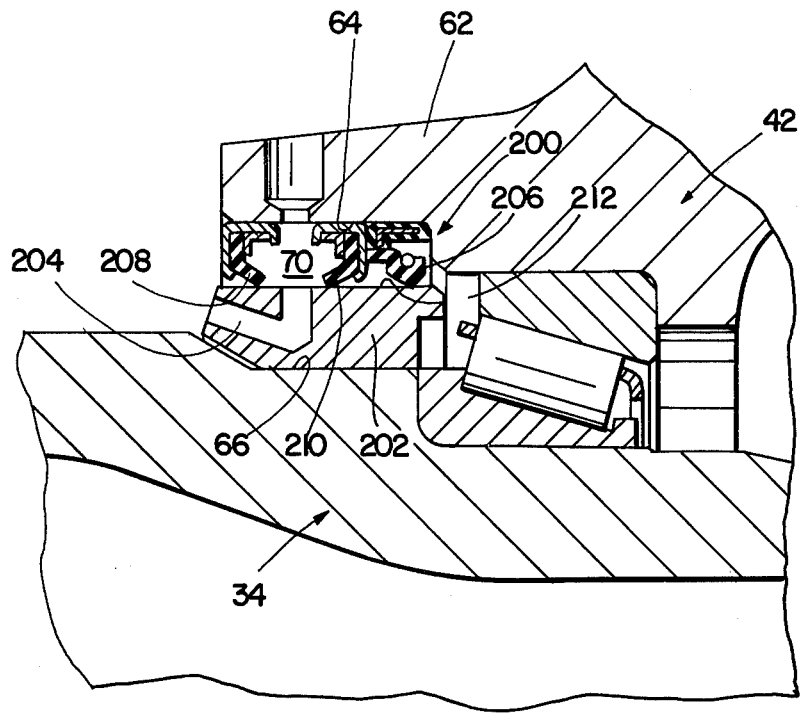
FIG. 5 is a sectional view of an alternate rotary seal assembly.

An alternate rotary seal assembly 200 may be seen by reference to FIG. 5. Seal assembly 200 is received within the inboardly opening annular space defined by surfaces 64 and 66 of hub 42 and spindle 34, respectively, and defines an annular air chamber 70. The assembly 200 comprises an annular ring 202 press fit to surface 66 and defining an inlet passage 204 to the air chamber 70. Seal lips 206, 208 and 210 are press fit to surface 64 and extend radially inwardly to sealingly engage radially outer annular surface 212 of ring 202. Lip 206 is an oil seal lip while lips 208 and 210 are air seal lips.

Other aspects, objects and advantages of this invention can be obtained from a study of the drawings, the disclosure and the appended claims.

We claim:

1. An axle wheel end assembly for vehicles having an onboard tire inflation system, said wheel end assembly comprising:
   an axle housing having an outboard generally annular spindle end,
   a wheel hub surrounding said spindle end and rotatably supported thereon by bearing means, said hub including a radially outwardly extending flange portion adapted to mount a wheel assembly including a tire rim, said hub including an annular sleeve portion extending axially inboardly from said bearing means and having an annular inner diameter surface concentric with and spaced radially from the axially aligned outer diameter surface of said spindle to define an inboardly opening annular space therebetween,
   a rotary seal assembly received entirely in said inboardly opening annular space, said rotary seal assembly defining a sealed annular fluid chamber located entirely in said annular space,
   inlet means to said chamber for fluidly connecting said chamber to said inflation system,
   outlet means from said chamber for connection to a fluid conduit,
   fluid conduit means connected at one end to said outlet means and at the other end thereof to an aperture in said tire rim located outboard of said hub flange portion, said conduit extending generally axially through said hub flange portion, and
   a manually operable open/close valve located in said conduit outboard of said hub flange portion for selectively isolating the interior of said tire rim from said chamber.

2. The wheel end assembly of claim 1, wherein said hub flange includes an array of bolt apertures and said wheel assembly is mounted to said hub by a plurality of bolts received through said bolt apertures, one of said bolts including an axially extending through bore defining a portion of said fluid conduit means.

3. The wheel end assembly of claim 2, wherein said open/close valve is threadably attached to the outboard end of said through bore.

4. The wheel end assembly of claims 1 or 2, wherein said axle is a drive axle, said axle housing is hollow and additionally including an axle shaft rotatably received in said housing, said axle shaft having an outboard flange drivingly attached to said hub.

5. The wheel end assembly of claim 4, wherein said bearing means comprised an inboard and an outboard bearing, said sleeve portion of said hub extends axially inboardly from said inboard bearing.

6. The wheel end assembly of claims 1, 2 or 3, wherein said outlet means comprises a radially extending through bore in said sleeve portion axially aligned with said chamber.

7. The wheel end assembly of claim 6, wherein said seal assembly comprises:
   a first annular generally cross-sectionally L-shaped seal member having an annular axially extending first base portion sealingly press fit to said spindle outer diameter surface and a first radially extending portion extending radially outwardly from the inboard end of said first base portion, said first radially extending portion carrying a first resilient annular seal lip member on the radially outward end thereof, and
   a second annular generally cross-sectionally L-shaped seal member having an annular axially extending second base portion sealingly pressfit to said sleeve inner diameter surface and a second radially extending portion extending radially inwardly from the outboard end of said second base portion, said second radially extending portion carrying a second resilient annular seal lip member on the radially inward end thereof, said second radially extending portion located axially outboardly of said first radially extending portion, said first seal lip member sealingly engaging the inboard end of the inner diameter surface of said second base portion and said second seal lip member sealingly engaging the outboard end of the outer diameter surface of said first base portion.

8. The axle wheel end assembly of claim 7, wherein said first seal lip member comprises an inboard dirt lip and an outboard air sealing lip and said second seal lip member comprises an inboard air sealing lip and outboard oil seal lip.

9. The axle assembly of claim 7, wherein said second base portion includes an aperture aligned with said threaded through bore.

10. The axle assembly of claim 7, wherein said first radially extending portion includes an aperture defining said inlet means.

* * * * *